US012635691B2

(12) United States Patent (10) Patent No.: US 12,635,691 B2
Piorkowski et al. (45) Date of Patent: May 26, 2026

(54) FIPRONIL CONTAINING INSECTICIDE GELS

(71) Applicant: Henkel AG & Co. KGaA, Düsseldorf (DE)

(72) Inventors: Daniel Thomas Piorkowski, Fairfield, CT (US); David Anthony Reagan, Ansonia, CT (US); Jordi Cortes Barea, Barcelona (ES); Eduard Monsonis Guell, Barcelona (ES); Elle Puigpelat Rubio, Sitges (ES); Andreas Bauer, Kaarst (DE); Frank Pessel, Duesseldorf (DE); Peter Schmiedel, Duesseldorf (DE)

(73) Assignee: Henkel AG & Co. KGaA, Düsseldorf (DE)

( * ) Notice: Subject to any disclaimer, the term of this patent is extended or adjusted under 35 U.S.C. 154(b) by 335 days.

(21) Appl. No.: 18/469,951

(22) Filed: Sep. 19, 2023

(65) Prior Publication Data

US 2024/0206467 A1 Jun. 27, 2024

Related U.S. Application Data

(60) Provisional application No. 63/476,691, filed on Dec. 22, 2022.

(51) Int. Cl.
| | |
|---|---|
| *A01N 43/56* | (2006.01) |
| *A01N 25/04* | (2006.01) |
| *A01N 25/10* | (2006.01) |
| *A01N 25/22* | (2006.01) |
| *A01N 25/30* | (2006.01) |

(52) U.S. Cl.
CPC ............. *A01N 43/56* (2013.01); *A01N 25/04* (2013.01); *A01N 25/10* (2013.01); *A01N 25/22* (2013.01); *A01N 25/30* (2013.01)

(58) Field of Classification Search
CPC ...... A01N 43/56; A01N 25/04; A01N 25/006; A01P 7/04
See application file for complete search history.

(56) References Cited

U.S. PATENT DOCUMENTS

| | | | |
|---|---|---|---|
| 8,293,733 | B2 | 10/2012 | Casana Giner et al. |
| 8,921,408 | B2 | 12/2014 | Soll et al. |
| 10,646,473 | B2 | 5/2020 | Soll et al. |
| 10,791,732 | B2 | 10/2020 | Shah et al. |
| 2010/0041727 | A1 | 2/2010 | Saxell et al. |
| 2011/0177948 | A1 | 7/2011 | Vermeer et al. |
| 2013/0195946 | A1 | 8/2013 | Stamper et al. |

FOREIGN PATENT DOCUMENTS

| | | |
|---|---|---|
| AU | 2018202648 A1 | 5/2018 |
| CN | 101044858 A | 10/2007 |
| CN | 107669630 A | 2/2018 |
| CN | 109953033 A | 7/2019 |
| JP | 6445102 B2 | 12/2018 |
| MX | 2011005184 A | 7/2011 |
| WO | 2012-107266 A1 | 8/2012 |

OTHER PUBLICATIONS

International Search Report and Written Opinion dated May 3, 2024 issued in PCT/US2023/085831.
Bayer Maxforce Roach Killer Bait Gel; https://pestcontrolsupplies.com/product/maxforce-roach-bait-gel/; downloaded from Internet on Sep. 18, 2023.
Combat Roach Gel, Combat Max, Combat Roach Bait Strips, Combat Ant Gels/Bait Strips (US) https://www.combatbugs.com/; downloaded from Internet Sep. 18, 2023.
Gong, Wenwen, et al. "Comparative analysis on the sorption kinetics and isotherms of fipronil on nondegradable and biodegradable microplastics." Environmental Pollution 254 (2019): 112927.
Johnson's Fipronil Spot-on solution for cats (fleas and ticks); http://www.finnfur.co.uk/Johnsons-Fipronil-For-Cats-3-Treatment; downloaded from Internet on Sep. 18, 2023.

*Primary Examiner* — Sahar Javanmard
(74) *Attorney, Agent, or Firm* — Blank Rome LLP

(57) ABSTRACT

An insecticidal composition includes fipronil in an amount of less than 0.1 wt. %, at least one surfactant, at least one emulsion stabilizer, and at least one arthropod attractant, wherein the insecticidal composition has a viscosity of more than about 50 centipoises. The insecticidal composition has improved stability and prevents migration of fipronil into plastic packaging over time, such that the composition retains more than about 90% of fipronil when stored in a plastic packaging for 3 months or more at room temperature.

17 Claims, No Drawings

FIPRONIL CONTAINING INSECTICIDE GELS

FIELD OF THE INVENTION

This disclosure relates to pesticide emulsion formulations. Specifically, the disclosure relates to fipronil emulsion formulations and methods for using the same.

BACKGROUND OF THE INVENTION

Insect pests, such as mosquitoes, flies, fleas, mites, and ticks, are known to be a nuisance to humans. Insect bites can cause discomfort or adverse inflammatory reactions. Some insects can carry bacterial and/or viral diseases that pose a significant health hazard to humans.

Accordingly, to kill, repel and/or control pests, insecticides or repellents are used in areas where the presence of these pests is not desired.

Synthetic chemical insecticides have historically provided effective means for controlling pests. Fipronil is a synthetic insecticide that was first placed on the market in 1993. Fipronil is used as an all-purpose insecticide for pests including, but not limited to, ants, beetles, cockroaches, fleas, lice, termites, ticks, rootworms, and crickets. Fipronil is used around the world as a half a billion-dollar market and continues to grow.

The effectiveness of fipronil occurs when it comes into contact with an insect. Fipronil inhibits the chlorine channels of insect—but not mammal—GABAA receptors, causing hyperexcitation, paralysis, and eventually death. Target insects are therefore differentiated by method of application.

Fipronil comprising formulations are available commercially in liquid, granular, solid and gel form. Liquid application is used for spot-on pet care products and crop protection, while granular application is used for lawn care. Solid and gel applications are used as bait for home protection, most commonly against ants or cockroaches.

When the products are formulated in a gel medium, they are often packaged in the forms of capsules, syringes, or adhesive strips. The packaging materials frequently contain plastics. Studies showed that fipronil may migrate from the gel formulas to the plastics after storage, but does not migrate in glass storage. In particular, in the studies performed by the present inventors, the plastics in the packaging materials were ground into fine powders, which were subject to extraction and an HPLC analysis, which confirmed that reductions of fipronil in gel formulas during storage had a corresponding increase of fipronil in the packaging plastics. Such plastics may include, but are not limited to, polystyrene/butadiene blend, polyethylene (PE) thermoformed, or PET/PE copolymer (PE: Polyethylene terephthalate). In comparison, no fipronil migration was observed when glass was used for packaging and storing the products in contact with the formulas.

Plastics are cheaper and more versatile as a packaging material than glass. There is a great need to improve the stability of gel fipronil products, e.g., to prevent the fipronil migration to plastics.

It is, therefore, an object of the present invention to improve upon existing fipronil gel formulations by increasing their shelf life and thus, efficacy.

SUMMARY OF THE INVENTION

The foregoing is achieved by provision of an insecticidal composition including fipronil in an amount from about 0.0001 wt. % to about 0.1 wt. %, at least one arthropod attractant in an amount from about 15 wt. % to about 55 wt. %, at least one surfactant in an amount from about 0.1 wt. % to about 10 wt. %, at least one gelling agent in an amount from about 0.1 wt. % to 5 wt. %, and at least one preservative in an amount from about 0.001 wt. % to about 5.0 wt. %. The insecticidal composition is provided in a form of an emulsion that has a viscosity of more than about 50 centipoises. The composition retains more than about 90% of fipronil when stored in a plastic packaging for 3 months at 25° C.

In some embodiments, the arthropod attractant is selected from a sugar, a combination of sugars, corn syrup, and a combination thereof.

The composition may contain polyoxythylene (2) sorbitan monopalmitate, ethoxylated hydrogenated castor oil, glycereth-17 cocoate, and a combination thereof as the surfactant.

In some embodiments, the composition further includes at least one organic solvent. The organic solvent may be selected from propylene glycol, ethylene glycol, N-methyl-2-pyrrolidone, ethanol, and a combination thereof.

In some embodiments, the composition further includes from about 50 wt. % to about 70 wt. % water.

The insecticidal composition may further include a neutral or weighting oil that is pre-blended with Fipronil. Alternatively, semisolid or solid lipid nanoparticles may be pre-blended with Fipronil.

In some embodiments, the composition includes at least one viscosity adjusting agent to adjust the viscosity of the composition to more than about 80 centipoises.

In certain embodiments, a biocide may be added to the composition in an amount of up to about 2 wt. %, wherein the biocide is other than fipronil. The biocide may be a mixture of 1.11% 5-chloro-2-methyl-4-isothiazolin-3-one and 0.037% 2-methyl-4-isothiazolin-3-one, or any other suitable biocide known in the art. The biocide acts as a preservative in the insecticidal composition.

It may be desirable to adjust pH of the insecticidal composition. For this purpose, the composition may include up to about 2 wt. % of a pH adjusting agent, which may be acetic acid, citric acid or a combination thereof, or any other known suitable pH adjusting agent.

In some embodiments, the gelling agent in the composition is kappa carrageenan.

The objectives of the invention may also be achieved by an insecticidal composition including fipronil in an amount of less than 0.1 wt. %, at least one surfactant, at least one emulsion stabilizer, and at least one arthropod attractant, wherein the insecticidal composition has a viscosity of more than about 50 centipoises. The surfactant may be selected from polyosyethylene sorbitan ester and one or more ethoxylated glycerides.

In another embodiment of the invention, an insecticidal arthropod bait product is provided including one of the insecticidal compositions described above in a plastic packaging. The insecticidal composition has improved stability such that it retains more than about 90% of fipronil when stored in the plastic packaging for 3 months at 25° C.

The plastic packaging may be a capsule, a syringe, a bait trap, or an adhesive strip, and may include at least one of a polystyrene/butadiene blend, polyethylene thermoformed, and a PET/PE copolymer.

DETAILED DESCRIPTION OF THE INVENTION

The following detailed description is merely exemplary in nature and is not intended to limit the disclosed pesticide formulations, or any associated methods for producing or using the same described herein. Furthermore, there is no intention to be bound by any theory presented in the preceding background or the following detailed description.

The term "about" as used in connection with a numerical value throughout the specification and the claims denotes an interval of accuracy, familiar and acceptable to a person skilled in the art. In general, such interval of accuracy is ±10%. Thus, "about ten" means 9 to 11. All numbers in this description indicating amounts, ratios of materials, physical properties of materials, and/or use are to be understood as modified by the word "about," except as otherwise explicitly indicated.

"At least one", as used herein, relates to one or more, i.e., 1, 2, 3, 4, 5, 6, 7, 8, 9, or more. If used in combination with a compound, the term does not relate to the absolute number of molecules but rather to the number of different types of said compound.

The term "substantially", as used herein, means at least about 80%, preferably at least about 90%, more preferably at least about 99%, for example at least about 99.9%. In some embodiments, the term substantially can mean completely, or about 100%.

As used herein, the term "comprising" means including, made up of, composed, characterized by or having.

"Free of", as used herein in relation to a specific type of component, means that the referenced composition does not contain more than 0.5 wt. %, preferably no more than 0.1 wt. %, more preferably no more than 0.05 wt. % of said component relative to the total weight of the composition. Most preferably, said component is not contained at all.

The term "arthropod" refers to invertebrate animals with jointed limbs, a segmented body, and an exoskeleton. They belong to the phylum Arthropoda and include, but are not limited to insects, mites, spiders, ticks, arachnoids, arachnids, larvae, parasites, and like invertebrates.

The compositions and methods of the invention may be used to kill any type of arthropod, such as an insect. Exemplary arthropods that can be killed include but are not limited to beetles, cockroaches, flies, ants, larvae, lice, fleas, mosquitoes, mites, ticks, and the like. Exemplary arthropod orders can include but are not limited to orders Acariformes, Anoplura, Araneae, Blattodea, Coleoptera, Collembola, Diptera, Grylloptera, Hemiptera, Heteroptera, Homoptera, Isopoda, Isoptera, Ixodida, Mantodea, Mallophaga, Neuroptera, Odonata, Orthoptera, Parasitiformes, Psocoptera, Siphonaptera, Symphyla, Thysanura, and Thysanoptera, and the like.

The terms "insecticide formulation," "insecticide composition", "pesticide formulation," and "pesticide composition" as used herein refers to a composition that causes at least about 1% of the exposed arthropods to die. In some embodiments, the terms encompass compositions that cause at least about 5%, at least about 10%, at least about 25%, at least about 50%, at least about 75% and at least about 90% of the exposed arthropods to die.

Absent explicit statement to the contrary, reference to wt. %, or wt %, or percent by weight, in the specification refers to the weight percentage of an ingredient as compared to the total weight of the insecticide composition. The wt. % of the total water in the liquid composition is calculated based on all the water including those added as a part of individual ingredients. When an ingredient added to make the liquid composition is not 100% pure and used as a mixture, e.g., in a form of a solution, the wt. % of that material added refers to the weight percentage of the mixture. Thus, a component which is 5 wt. % of the formulation, may be added as 5 wt.

% of a pure component or 10 wt. % of solution that is 50% component and 50% water. Either result produces the recited 5 wt. % amount of the component in the resulting formulation. All percentages presented in this specification and the associated claims are weight percentages unless explicitly identified otherwise. If not indicated otherwise, all percentages refer to active matter and are by weight relative to the total weight of the composition.

The term "carrier" as used herein refers to an inert or fluid material, which may be inorganic or organic and of synthetic or natural origin, with which the active compound is mixed or formulated to facilitate its application to the object to be treated, or its storage, transport and/or handling.

The term "fipronil" refers to a member of the phenylparazole pesticide group of compounds disclosed, for example, in U.S. Pat. Nos. 6,096,329, 6,395,765 and 6,716,442, all of which are incorporated herein by reference. Fipronil has the formula 1-[2,6-Cl$_2$ 4-CF$_3$ phenyl] 3-CN 4-[SO—CF$_3$] 5-NH$_2$ pyrazole. Fipronil and related phenylparasole compounds can be prepared according to the methods described in patent applications WO-A-87/3781, 93/6089 and 94/21606 or European Patent Application EP-A-295117, all of which are incorporated herein by reference. Fipronil solubility in water is 0.002 g/l (20° C., BASF SDS).

It has been unexpectedly discovered by the inventors of the present application that fipronil emulsions provide an enhanced stability of fipronil in the compositions. Without wishing to be bound by theory, it is believed that fipronil emulsions have properties of electrostatic repulsion (charge repulsion) or steric repulsion (physical barrier repulsion) of the plastics, and thus prevent fipronil migration to the plastics.

The pesticide compositions of the present invention can be provided in the form of an oil-in-water emulsion, a water-in-oil emulsion, a micelle formulation, a solution, a suspension, a dispersion, and the like.

In certain embodiments, the pesticide compositions are comprised of emulsion compositions. In some embodiments, the emulsion compositions are in a form of a gel having a certain viscosity.

In some embodiments, the pesticide formulations comprise fipronil, one or more surfactants, and one or more arthropod attractants. In additional embodiments, the pesticide formulations comprise fipronil, one or more solvents, one or more arthropod attractants, one or more surfactants, one or more emulsion stabilizer, and water. In further embodiments, the pesticide formulations may additionally contain one or more preservatives, a biocide, one or more pH adjusting agents, one or more viscosity adjusting agents, and any combination thereof.

Surfactant

Surfactants are well known in the art, and any combination of suitable surfactants or surfactant systems can be used in the pesticidal compositions described herein.

The compositions of the invention may contain one or more surfactants. Useful surfactants in the pesticidal compositions of the present invention include, for example, an anionic surfactant, a nonionic surfactant, a cationic surfactant, an ampholytic surfactant, a zwitterionic surfactant, and/or mixtures thereof. Suitable surfactant may also include low molecular weight and high molecular weight surfactants. The use of multiple surfactants of a particular type or a distribution of different weights of a surfactant may be particularly useful.

Suitable anionic surfactants are alkali metal, alkaline earth metal or ammonium salts of sulfonates, sulfates, phosphates or carboxylates. Examples of sulfonates are alkylarylsulfonates, diphenylsulfonates, alpha-olefin-sulfonates, sulfonates of fatty acids and oils, sulfonates of ethoxylated alkylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates and carboxylated alcohol or alkylphenol ethoxylates.

Suitable nonionic surfactants are alkoxylates, N-alkylated fatty acid amides, amine oxides, esters or sugar-based surfactants. Examples of alkoxylates are compounds such as alcohols, alkylphenols, amines, amides, arylphenols, fatty acids or fatty acid esters which have been alkoxylated. Ethylene oxide and/or propylene oxide may be employed for the alkoxylation, preferably ethylene oxide. Examples of N-alkylated fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides.

Suitable cationic surfactants are quaternary surfactants, for example quaternary ammonium compounds with one or two hydrophobic groups, or salts of long-chain primary amines. Suitable amphoteric surfactants are alkylbetaines and imidazolines. Suitable block polymers are block polymers of the A-B or A-B-A type comprising blocks of polyethylene oxide and polypropylene oxide or of the A-B-C type comprising alkanol, polyethylene oxide and polypropylene oxide. Suitable polyelectrolytes are polyacids or polybases. Examples of polyacids are alkali metal salts of polyacrylic acid. Examples of polybases are polyvinylamines or polyethyleneamines.

In some embodiments, the surfactant used in the pesticidal composition is a nonionic surfactant. In certain embodiments, the nonionic surfactant is selected from polyosyethylene sorbitan ester and one or more ethoxylated glycerides. In some embodiments, the surfactant is selected from polyoxyethylene (20) sorbitan monopalmitate, ethoxylated hydrogenated castor oil (PEG-40 hydrogenated castor oil) and glycereth-17 cocoate, or combinations thereof.

The composition according to the invention can comprise various amounts of surfactants. The surfactant can comprise from 0.1 to 20% by weight, preferably from 0.5% to 10% by weight, more preferably from 1% to 10% by weight, and in particular from 1% to 5% by weight of total amount of surfactants, based on the total amount of the composition.

Solvents

The inventive pesticide composition may include various solvents. The solvent may serve as a carrier and/or a synergist. The solvent may assist in fast penetration through the cell membrane of an arthropod being controlled to ensure the arrival of sufficient active ingredients to the site of action. The solvent may assist in wetting the arthropod exoskeleton to facilitate exposure of the cell membrane to the formulation and/or may dissolve portions of the exoskeleton.

Various solvents may be used in accordance with the present invention, either alone or in combination of two or more solvents. Suitable organic solvents may include, but are not limited to, mineral oils, lower alcohols or esters having a molecular weight of less than 400. In some embodiment, the suitable organic solvents may include propylene glycol, ethylene glycol, N-methyl-2-pyrrolidone, ethanol, or a combination thereof.

In further embodiments, different neutral oils or weighting oils can be pre-blended with Fipronil to provide less affinity to the plastic. In preferred embodiments, semisolid or solid lipids are pre-blended with Fipronil and then hot homogenized and cooled to form solid lipid nanoparticles, which may offer the best protection from plastic degradation.

The composition according to the invention can comprise various amounts of solvents. The solvents can comprise from 0.01 to 10% by weight, preferably from 0.05% to 5% by weight, more preferably from 0.1% to 1% by weight of total amount of solvents, based on the total amount of the composition.

Attractant

The inventive pesticide composition may include various attractants. The attractant serves to lure arthropods to the trap and entice the arthropod to ingest or otherwise come into contact with the pesticide.

In some embodiments, the attractants may be food-based attractants. The use of food-based attractants is commonly known in the art. In certain embodiments, the food-based attractants include a sugar or combination of sugars. Such sugars include, but are not limited to sucrose, corn syrup, dextrose or glucose. It is understood that other suitable attractants may be used in the spirit of the invention.

In some embodiments, the attractant may also have a secondary benefit of adjusting the viscosity of the emulsion formulation, in addition to the attractive effect.

In some embodiments, the attractant is selected from sucrose, corn syrup, and dextrose, or combinations thereof.

In certain embodiments, the attractant may be present in an amount of about 10 wt. % to about 50 wt. %, or about 20 wt. % to about 40 wt. %, or about 25 wt. % to about 35 wt. %, based on the total amount of the composition.

Water

The pesticide formulations of the present invention may be water-based, oil-based formulations or combinations of those formulations. In some preferred embodiments, the formulation is an oil-in-water formulation.

Water is used as a solvent and is added to make the total wt. % to be 100. In some embodiments, water may be de-ionized water or demineralized water.

In some embodiments, water is present in an amount of from about 40 to about 80 wt. %, or from about 50 to about 70 wt. %, or from about 55 to about 65 weight percent, or about 60 wt. %. Preferably, water is present at not less than about 50% by weight of the pesticide composition.

Water may be added to the detergent composition directly or as a component of other ingredients, or directly and as a component of other ingredients.

Additional Ingredients

Embodiments of the present invention can utilize various other ingredients known in the art to be typically used in such formulations. These ingredients can include, but are not limited to, fillers, dispersants, water or other solvent medium or media, surfactants, suspension agents, sticking agents, stabilizers, preservatives, dyes, pigments, masking agents, emollients, excipients, post-application detection agents, additional active ingredients, antifoaming agents, anti-microbial agents, anti-oxidants, emulsifiers, fats, fluorescent materials, fungicides, hydrotropes, optical brighteners, perfume carriers, perfume, proteins, silicones, solubilizers, sugar derivatives, waxes, and the like.

The compositions of the present invention may also include additional active ingredients such as, for example, additional pest-combating ingredients, such as repellents and/or cidal agents.

Preservatives

In order to provide a reasonable shelf-life to the inventive pesticidal compositions, it is preferable that a preservative be added to the composition. Any suitable commercially available preservatives known to those of ordinary skill in the art may be suitably used with the inventive compositions.

Examples of suitable preservatives include, but are not limited to, formaldehyde, alkyl esters of p-hydroxybenzoic acid, sodium benzoate, potassium sorbate, 2-bromo-2-nitro-propan-1,3-diol, o-phenylphenol, thiazolinones such as ben-zisothiazolinone, 5-chloro-2-methyl-4-30 isothiazolinone, pentachlorophenol, 2,4-dichlorobenzyl alcohol, citric acid, and mixtures thereof. In one preferred embodiment, the pesticidal composition includes sodium benzoate and/or potassium sorbate as a preservative. The preservative may also function as a pH adjusting agent. In another embodiment, the composition of the invention may also include citric acid as both a preservative and a pH adjusting agent.

The pesticide compositions of the present invention may contain about 0.001 wt. % to about 5 wt. % of one or more preservatives, or about 0.01 wt. % to about 2 wt. %, or about 0.1 wt. % to about 1 wt. % of one or more preservatives.

Biocide

In some embodiments, the pesticidal composition may further include an additional biocide agent other than fipronil. The biocide agent may function to further control arthropods, in addition to the action of fipronil. The biocide may also act as a preservative to control and/or hinder growth of bacteria and fungi in the composition.

Any suitable biocide known in the art may be added, such as a biocide commonly used in household products. In certain embodiments, a mixture of 1.11% wt. 5-chloro-2-methyl-4-isothiazolin-3-one and 0.37% 2-methyl-4-isothi-azolin-3-one or another mixture that is sufficiently active as a biocide may be used in the inventive compositions.

The pesticide compositions of the present invention may contain about 0.001 wt. % to about 5 wt. % of one or more biocides, or about 0.01 wt. % to about 2 wt. %, or about 0.1 wt. % to about 1 wt. % of one or more biocides.

pH Adjusting Agents pH adjusting agents may be added to and included in the pesticide compositions. Exemplary pH adjusting agents include, but are not limited to, monoethanol amine, binary amines, buffers, triethanol amine, metal hydroxides, or other materials. Exemplary metal hydroxides are sodium hydroxide and/or potassium hydroxide, and other possible pH adjusting agents include compounds that adjust the pH of the composition, such as acetic acid or citric acid. In preferred embodiments, the pH adjusting agent is acetic acid or citric acid. In other embodiments, basic compounds may be used to adjust the pH of the compositions, alone or in combination with acidic agents.

pH adjusting agents may be present in the pesticide composition at an amount of from about 0 to about 10 wt. % in some embodiments, based on the total weight of the composition, but in other embodiments the pH adjusting agent may be present in an amount of from about 0.01 to about 5 wt. %, or an amount of from about 0.05 to about 3 wt. %, based on the total weight of the composition. In preferred embodiments, the pH adjusting agents are present in an amount of about 0.01 to 1 wt. %, based on the total weight of the composition.

The pH adjusting agent may be utilized to adjust the pH of the pesticide composition to from about 4 to about 8, or from about 5 to about 7 in various embodiments.

Emulsion Stabilizer

The inventive pesticide composition may further include one or more emulsion stabilizers or gelling agents to stabilize the emulsion composition. Emulsion stabilizers are well known in the art, and any combination of suitable stabilizer or stabilizer systems can be used in the pesticidal compositions described herein.

Additional emulsion stabilizers include paraffinic hydrocarbons such as tetradecane, hexadecane and the like.

Emulsion stabilizers useful in the inventive compositions may include, but are not limited to, one or more low molecular weight homopolymers (<5000 mw) of the following: polyolefins, such as polybutadiene, polyisoprene, poly(substituted butadienes), such as poly(2-t-butyl-1,3-butadiene), polyethylene, chlorinated polyethylene, polypropylene, polybutene, polyisobutene, polycyclopentylethylene and polycyclolhexylethylene; polyacrylates, including polyalkylacrylates and polyarylacrylates; polymethacrylates, including polyalkylmethacrylates and polyarylmethacrylates; polydisubstituted esters, such as poly(di-n-butylitaconate) and poly(amylfumarate); polyvinylethers, such as poly(butoxyethylene) and poly(benzyloxyethylene); poly (methyl isopropenyl ketone); polyvinyl chloride; polyvinyl carboxylate esters such as polyvinyl acetate, polyvinyl propionate, polyvinyl butyrate, polyvinyl caprylate, polyvinyl laurate, polyvinyl stearate and polyvinyl benzoate; polystyrenes, like polystyrene, poly-t-butyl styrene, poly (substituted styrene) and poly(biphenyl ethylene); polycyclodienes, like poly(1,3-cyclohexadiene) and polycyclopentadiene and the like; and low molecular weight (<5000 mw) co-polymers of styrene, alkyl styrenes, isoprene, butenes, isobutenes, butadiene, acrylonitrile, alkyl acrylates, alkyl methacrylates, vinyl chloride, vinylidene chloride, vinyl esters of lower carboxylic acids and alpha, beta-ethylenically unsaturated carboxylic acids and esters thereof, including co-polymers containing three or more different monomer species, and the like. In one preferred embodiment, polysaccharides, such as kappa carrageenan, are used as emulsion stabilizers.

The pesticide compositions of the present invention may contain about 0.01 wt. % to about 10 wt. % of one or more preservatives, or about 0.1 wt. % to about 5 wt. %, or about 0.5 wt. % to about 3 wt. % of one or more emulsion stabilizers or gelling agents.

Viscosity Adjusting Agent

In certain embodiments, one or more viscosity adjusting agents may be used to increase or decrease the viscosity of the emulsion composition so the emulsion can be readily applied via capsule, syringe, or adhesive strips.

Any viscosity adjusting agent may be used in the present invention. Such viscosity adjusting agents include, but are not limited to, liquid sorbitol, liquid maltitol, maltodextrin, or polydextrose. In some preferred embodiments, the viscosity adjusting agent may additionally function as an attractant. Such viscosity adjusting agents that additionally function as an attractant include, but are not limited to, sucrose, fructose, dextrose, and corn syrup.

In certain embodiments, one or more viscosity adjusting agents may be present in an amount of about 10 wt. % to about 50 wt. %, or about 20 wt. % to about 40 wt. %, or about 25 wt. % to about 35 wt. %, based on the total amount of the composition. In additional embodiments, viscosity adjusting agents may be present in an amount of about 0.01 wt. % to about 10 wt. %, or about 0.1 wt. % to about 5 wt. %, or about 0.5 wt. % to about 3 wt. %, based on the total weight of the composition.

Colorants

Further, the pesticide compositions of the present invention may additionally contain a coloring agent or colorant. In some embodiments, the pesticide composition contains one or more colorants. Suitable examples of such coloring agents or colorants that may be utilized include, but are not limited to, inorganic pigments such as metal oxides, titanium oxides and Prussian blue, organic dyes such as alizarine dyes, azodyes and metallic phthalocyanine dyes, iron, manganese, boron, copper, cobalt, molybdenum, zinc and salts thereof, and the like, or a mixture thereof.

The colorant(s) can be, for example, polymers. The colorant(s) can be, for example, dyes. The colorant(s) can be, for example, water-soluble polymeric colorants. The colorant(s) can be, for example, water-soluble dyes. The colorant(s) can be, for example, colorants that are well-known in the art or commercially available from dye or chemical manufacturers. The color of the colorant(s) is not limited, and can be, for example, red, orange, yellow, blue, indigo, violet, or any combination thereof.

The total amount of the one or more colorant(s) that can be contained in the pesticidal composition, for example, can range from about 0.00001 wt. % to about 0.099 wt. %. The total amount of colorant(s) in the pesticidal composition can be, for example, about 0.0001 wt. %, about 0.001 wt. %, about 0.01 wt. %, about 0.05 wt. %, or about 0.08 wt. %.

Bittering Agents

Bittering agents may optionally be added to hinder accidental ingestion of the pesticidal composition. Bittering agents are compositions that taste bad, so children or others are discouraged from accidental ingestion. Exemplary bittering agents include denatonium benzoate, aloin, and others. Bittering agents may be present in the wash composition at an amount of from about 0 to about 1 weight percent, or an amount of from about 0.001 to about 0.5 weight percent, or an amount of from about 0.001 to about 0.25 weight percent in various embodiments, based on the total weight of the pesticidal composition.

Product Packaging

The compositions in the present invention may be sold as a long-lasting insecticidal product packaged in plastic packaging. Suitable packaging plastics may include, but are not limited to, polystyrene/butadiene blend, polyethylene (PE) thermoformed, or PET/PE copolymer (PE: polyethylene terephthalate).

In some embodiments, the insecticidal product may be sold as an emulsion or gel medium comprising the inventive compositions packaged as a bait trap in plastic packaging. In other embodiments, the insecticidal product may be sold as an emulsion or gel medium packaged as a capsule in plastic packaging. In additional embodiments, the insecticidal product may be sold as an emulsion or gel medium packaged as a syringe in plastic packaging. In further embodiments, the insecticidal product may be sold as an emulsion or gel medium packaged as an adhesive strip in plastic packaging.

In some embodiments, the pesticidal compositions have a viscosity of approximately 50 to 300 centipoise (cP) at 20° C. In some embodiments, the viscosity of the compositions is shear rate-dependent. The viscosity of the pesticidal emulsion compositions is chosen such that it allows the emulsion to be stored and applied via capsule, syringe, or adhesive strips. In additional embodiments, the composition viscosity is about 80 cP to about 250 cP, or about 90 cP to about 230 CP.

Methods of Use

The compositions of the present invention may be used to eliminate arthropods either by direct application to a host, such as human, animal or plant, or by treatment of an area within which arthropods are located.

In some embodiments, the pesticidal compositions are applied in areas where target arthropods are commonly found, such as indoor or outdoor areas. The pesticidal compositions are applied by spraying or other application method to a surface. In preferred embodiments, the pesticidal compositions are applied as an emulsion or gel medium packaged as a bait trap, an adhesive strip or a syringe.

The pesticide gel composition may be applied from a syringe to various outdoor or indoor surfaces where target arthropods may be found, such as begin appliances and in cracks and crevices. The syringe may be provided with a cap which is removed before use. The syringe is placed adjacent to the target surface and the pesticide composition is applied to the surface by depressing a syringe plunger. Reapplication after one to three months (or earlier if the formulation is already consumed by the insects) is advisable.

The pesticide composition may also be applied as a bait trap, which contains openings for arthropods to enter and contains the pesticide composition on the inside of the bait. The bait traps may be placed in any indoor or outdoor spaces where arthropods are found.

In other embodiments, the pesticide compositions are provided as bait strips that contain the pesticide composition in an emulsion or gel medium on the strip surface. The back surface of the strips has an adhesive used to attach the strips to various target surfaces where arthropods may be found.

Arthropods are attracted to the baits by various attractants included in the pesticide compositions. Arthropods then ingest the pesticide composition and take it back to the nest or colony, where they share it with other arthropods.

Once the pesticidal composition of the present invention is ingested by arthropods, it is effective at killing a certain percentage of arthropods within a certain time period. In some embodiments, at least 75% of arthropods are killed within 24 hours from exposure. In additional embodiments, at least 90% of arthropods are killed within 24 hours from exposure. In further embodiments, at least 50% of arthropods are killed within 30 seconds of exposure and at least 90% of arthropods are killed within 30 minutes of exposure. In other embodiments, at least 25% of arthropods are killed within 30 minutes of exposure, and at least 35% of arthropods are killed within 1 hour of exposure, and at least 40% of arthropods are killed within 1 hour from exposure.

EXAMPLES

The following batches were made using a standard overhead mixer (Caframo Stirrer BDC3030), with the rpm set between 200-400 to provide sufficient agitation. For the preparation of gel batches, water is heated and mixed with a gelling agent. Next, food attractants are added and, after slightly cooling the mix, preservatives are added. At the last stage, a fipronil pre-blend (fipronil with organic solvents and a surfactant) is added.

All compositions described below are given in % weight of each material included in the formula.

TABLE 1

| Component | Base Formula wt % | Example 1 wt % | Example 2 wt % | Example 3 wt % |
|---|---|---|---|---|
| Fipronil TG | 0.0001-0.01 | 0.001 | 0.001 | 0.001 |
| Food based attractants | 20-40 | 35 | 35 | 35 |

TABLE 1-continued

| Component | Base Formula wt % | Example 1 wt % | Example 2 wt % | Example 3 wt % |
|---|---|---|---|---|
| Preservatives | 0.1-1 | 0.60 | 0.60 | 0.60 |
| Biocide | 0-1 | 0.10 | 0.10 | 0.10 |
| PH adjusting agent | 0.01-1 | 0.12 | 0.12 | 0.12 |
| Organic Solvents | 0.01-1 | 0.09 | 0.09 | 0.09 |
| Emulsion stabilizer | 0.5-5 | 1 | 1 | 1 |
| Surfactant | 0.1-10 | | | |
| Polyoxyethylene (20) sorbitan monopalmitate | | 1.00 | | |
| Castor oil, hydrogenated, ethoxylated | | | 1.00 | |
| Glycereth-17-cocoate | | | | 1.00 |
| Viscosity adjusting agent | misc. | misc. | misc. | misc. |
| Water | 50-70 | q.s. | q.s. | q.s. |
| TOTAL= | 100 | 100 | 100 | 100 |

Examples 1-3 used the same formulation ingredients in the same amounts. The only variable was the use of a particular surfactant—polyoxyethylene (20) sorbitan monopalmitate (Example 1), ethoxylated hydrogenated castor oil (PEG-40 hydrogenated castor oil) (Example 2) and glycereth-17 cocoate (Example 3).

All of the three surfactants helped improve the stability of the formulations. However, the choice of surfactants is not limited to the above specified surfactants. Combinations of surfactants, rather than a single surfactant, may be also used in one formula.

In Example 1, polyoxyethylene (20) sorbitan monopalmitate is a surface-active agent that provides suitable consistency to the dosage form.

In Example 2, ethoxylated hydrogenated castor oil (PEG-40 hydrogenated castor oil) is a combination of synthetic polyethylene glycol (PEG) with natural castor oil. Ethoxylated hydrogenated castor oil can be used to emulsify and solubilize oil-in-water (o/w) emulsions.

In Example 3, glycereth-17 cocoate is an extra-mild non-ionic surfactant with co-emulsifying and solubilizing properties.

In some embodiments, an emulsion stabilizer is preferably added to stabilize the compositions. Such emulsion stabilizer may be Kappa carrageenan or any other suitable emulsion stabilizer.

Fipronil has a solubility in water around 0.002 g/l (20° C.). At a level of 0.001%, fipronil is soluble in the water-based matrix because its solubility in water is 0.002 g/l (20° C., BASF SDS). However, although being soluble in the formula, fipronil tends to migrate, under room temperature conditions and in high temperatures (tested up to 54° C.), into the container (i.e., plastic packaging) depending on the material that the container is made of:

a. Glass→No migration, formula stable (used as reference)

b. PET/PE thermoformed→Migration c. Polyethylene thermoform→Migration d. Polyethylene injected→No migration e. Polystyrene→No migration f. Polystyrene/Butadiene (4%)→migration Tables 2-5 below show stability tests of fipronil at 25° C., 40° C., and 54° C. respectively. In the accelerated tests (stress tests) and the room temperature test, the content is kept with the surfactants while there is loss of fipronil by migration to the plastic.

The stability tests were performed by preparing plastic capsules made with PET/PE and filling them with the gel formulation. Those capsules were closed and placed under stability study at 25° C., 40° C. and 54° C. After specific periods of time, the capsules were opened, and the gel was analyzed by HPLC to determine the content of fipronil.

The formulations in Table 2 were stored at 25° C. and fipronil content was tested after 3 months of storage and 9 months of storage. The test results are listed below in Table 2.

The formulations in Table 3 were stored at 40° C. and fipronil content was tested after 1 month, 2 months and 3 months of storage. The test results are listed below in Table 3.

The formulations in Table 4 were stored at 54° C. and fipronil content was tested after 2 weeks of storage. The test results are listed below in Table 4.

TABLE 2

| Surfactant | Initial fipronil content (% w/w) | Fipronil content after 3 months at 25° C. (% w/w) | Variation in % vs initial | Fipronil content after 9 months at 25° C. (% w/w) | Variation in % vs initial |
|---|---|---|---|---|---|
| None | 0.00101 | 0.00060 | −40.0 | | |
| Polyoxyethylene (20) sorbitan monopalmitate | 0.00102 | 0.00103 | 0.6 | 0.00101 | −1.3 |
| ethoxylated hydrogenated castor oil | 0.00104 | 0.00101 | −3.4 | 0.00102 | −1.6 |
| Glycereth-17-cocoate | 0.00092 | 0.00095 | 2.8 | 0.00096 | 4.4 |

TABLE 3

| Surfactant | Initial fipronil content (% w/w) | Fipronil content after 4 weeks at 40° C. (% w/w) | Variation in % vs initial | Fipronil content after 8 weeks at 40° C. (% w/w) | Variation in % vs initial | Fipronil content after 12 weeks at 40° C. (% w/w) | Variation in % vs initial |
|---|---|---|---|---|---|---|---|
| None | 0.00091 | 0.00060 | −34.1 | 0.00045 | −50.5 | | |
| Polyoxyethylene (20) sorbitan monopalmitate | 0.00113 | 0.00117 | 4.0 | 0.00116 | 3.1 | 0.0012 | 3.4 |
| ethoxylated hydrogenated castor oil | 0.00098 | 0.00099 | 1.5 | 0.00100 | 2.6 | 0.00101 | 1.0 |
| Glycereth-17-cocoate | 0.00094 | 0.00097 | 3.2 | 0.00098 | 4.3 | 0.00101 | 3.1 |

TABLE 4

| Surfactant | Initial fipronil content (% w/w) | Fipronil content after 2 weeks 54° C. (% w/w) | Variation in % vs initial |
|---|---|---|---|
| None | 0.00099 | 0.00026 | −73.7 |
| Polyoxyethylene (20) sorbitan monopalmitate | 0.00107 | 0.00102 | −4.7 |
| ethoxylated hydrogenated castor oil | 0.00085 | 0.00083 | −2.4 |
| Glycereth-17-cocoate | 0.00070 | 0.00070 | 0.0 |

As seen from the test data in Tables 2-4, it was discovered that the inclusion of the surfactants significantly stabilizes fipronil and unexpectedly prevents it from migration into plastics used for packaging. The sugars and other raw materials in the compositions may help to further stabilize fipronil in the formulas.

Table 5 below shows the viscosity tests of the inventive fipronil emulsion compositions. The viscosity determination depends on the share rate applied. The method is based on ISO 3219:1993; the test equipment is a Rheometer, BOHLIN CVO 100; and the test temperature is 20° C.

TABLE 5

| Share (rpm) | Viscosity (cP) at 20° C. |
|---|---|
| 8 | 222 |
| 13 | 145 |
| 21 | 99 |

The foregoing description of the embodiments will so fully reveal the general nature of the invention that others can, by applying knowledge within the skill of the art, readily modify and/or adapt for various applications such embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents. In addition, section headings, the materials, methods, and examples are illustrative only and not intended to be limiting.

What is claimed is:

1. An insecticidal composition comprising, based on the total weight of the insecticidal composition:
    fipronil in an amount of from about 0.0001 wt. % to about 0.1 wt. %;
    at least one arthropod attractant in an amount of from about 15 wt. % to about 55 wt. %;
    at least one surfactant in an amount of from about 0.1 wt. % to about 10 wt. %, the at least one surfactant being selected from the group consisting of polyoxyethylene (20) sorbitan monopalmitate, ethoxylated hydrogenated castor oil, glycereth-17 cocoate, and any combination thereof;
    at least one gelling agent in an amount of from about 0.1 wt. % to 5 wt. %; and
    at least one preservative in an amount of from about 0.001 wt. % to about 5.0 wt. %,
    wherein the insecticidal composition is in a form of an emulsion having a viscosity of more than about 50 centipoises, and
    wherein the insecticidal composition retains more than about 90% of the fipronil when stored in a plastic packaging for about 9 months at 25° C.

2. The composition of claim 1, wherein the at least one arthropod attractant is selected from the group consisting of a sugar, a corn syrup, and a combination thereof.

3. The composition of claim 1, further comprising at least one organic solvent.

4. The composition of claim 1, wherein the at least one organic solvent is selected from the group consisting of propylene glycol, ethylene glycol, N-methyl-2-pyrrolidone, ethanol, and any combination thereof.

5. The composition of claim 1, further comprising water in an amount of from about 50 wt. % to about 70 wt. %, based on the total weight of the insecticidal composition.

6. The composition of claim 1, further comprising at least one viscosity adjusting agent in an amount sufficient to adjust the viscosity of the insecticidal composition to more than about 80 centipoises.

7. The composition of claim 1, further comprising a preservative in an amount less than about 2 wt. %, based on the total weight of the insecticidal composition.

8. The composition of claim 7, wherein the preservative comprises a mixture of 1.11% 5-chloro-2-methyl-4-isothiazolin-3-one and 0.037% 2-methyl-4-isothiazolin-3-one.

9. The composition of claim 1, further comprising a pH adjusting agent in an amount less than about 2 wt. %, based on the total weight of the insecticidal composition.

10. The composition of claim 9, wherein the pH adjusting agent is selected from the group consisting of acetic acid, citric acid, and a combination thereof.

11. The composition of claim 1, wherein the at least one gelling agent is Kappa carrageenan.

12. An insecticidal composition comprising:

fipronil in an amount of from about 0.0001 wt. % to about 0.1 wt. %, based on the total weight of the insecticidal composition;

at least one surfactant, the at least one surfactant being selected from the group consisting of polyoxyethylene (20) sorbitan monopalmitate, ethoxylated hydrogenated castor oil, glycereth-17 cocoate, and any combination thereof;

at least one emulsion stabilizer; and at least one arthropod attractant, wherein the insecticidal composition has a viscosity of more than about 50 centipoises.

13. An insecticidal arthropod bait product comprising the insecticidal composition of claim 12 in a plastic packaging.

14. The product of claim 13, wherein the insecticidal composition retains more than about 90% of fipronil when stored for at least 3 months at 25° C.

15. The product of claim 13, wherein the plastic packaging comprises at least one of a polystyrene/butadiene blend, polyethylene, or a polyethylene terephthalate/polyethylene copolymer.

16. The product of claim 13, wherein the plastic packaging is a capsule, a syringe, a bait trap, or an adhesive strip.

17. An insecticidal composition comprising:

fipronil in an amount of from about 0.0001 wt. % to about 0.1 wt. %, based on the total weight of the insecticidal composition;

at least one surfactant, the at least one surfactant being selected from the group consisting of polyoxyethylene (20) sorbitan monopalmitate, ethoxylated hydrogenated castor oil, glycereth-17 cocoate, and any combination thereof;

Kappa carrageenan in an amount from about 0.1 wt. % to about 5 wt. %; and at least one arthropod attractant, wherein the insecticidal composition has a viscosity of more than about 50 centipoises, and wherein the insecticidal composition retains more than about 90% of the fipronil when stored in a plastic packaging for about 9 months at 25° C.

*  *  *  *  *